Feb. 19, 1952 V. M. DOWNEY 2,586,625
APPARATUS FOR TREATING MATERIALS
BY ULTRAVIOLET RADIATION
Filed June 8, 1948 2 SHEETS—SHEET 2
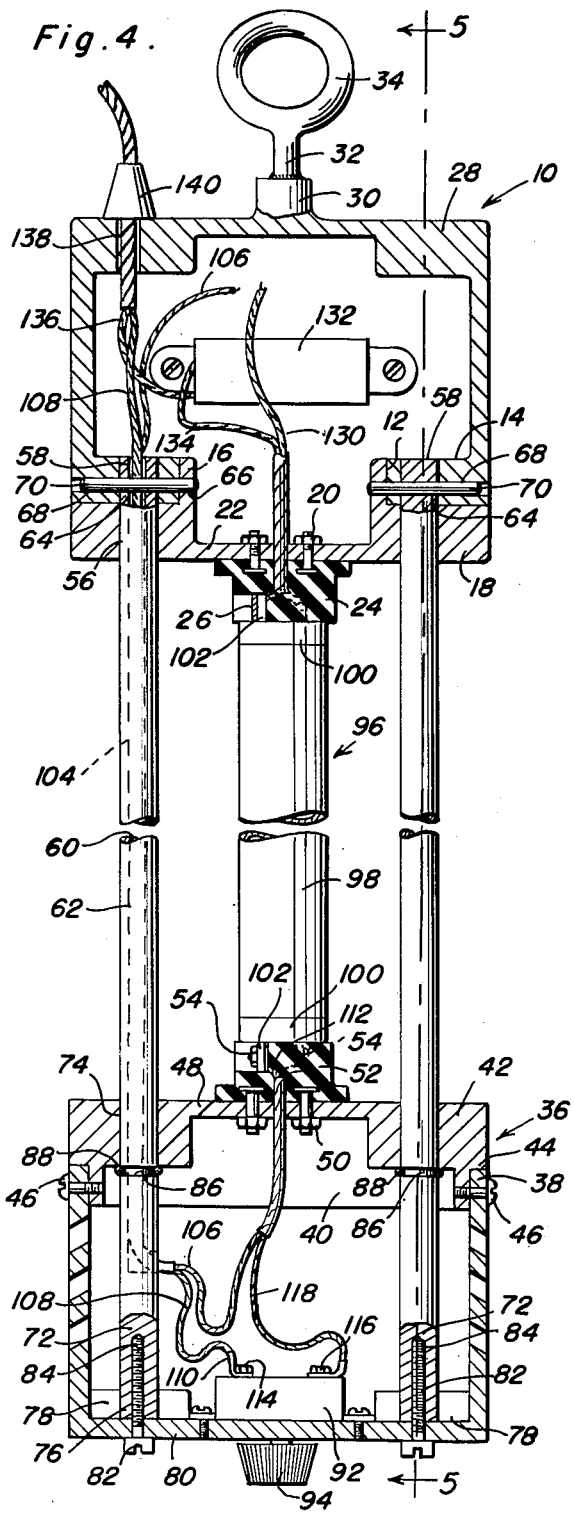
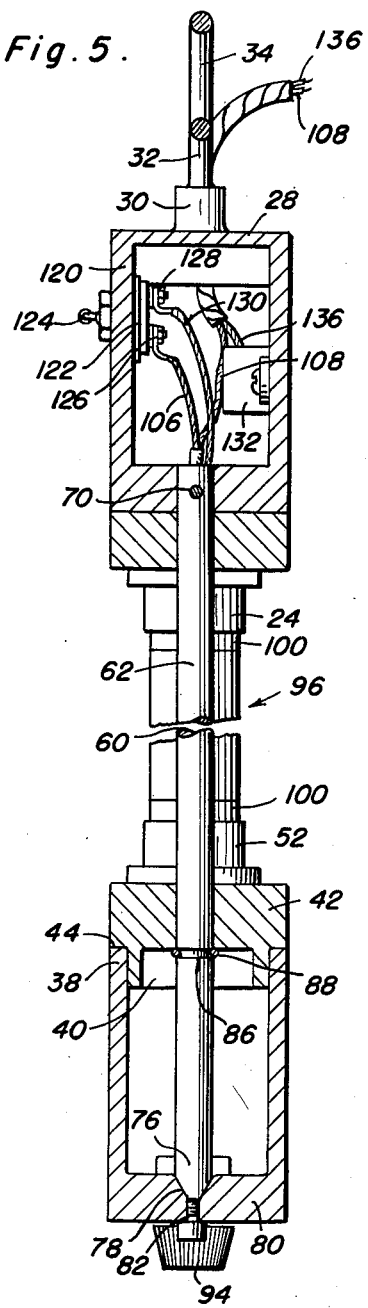
Virgil M. Downey
INVENTOR.
BY
Attorneys Patented Feb. 19, 1952

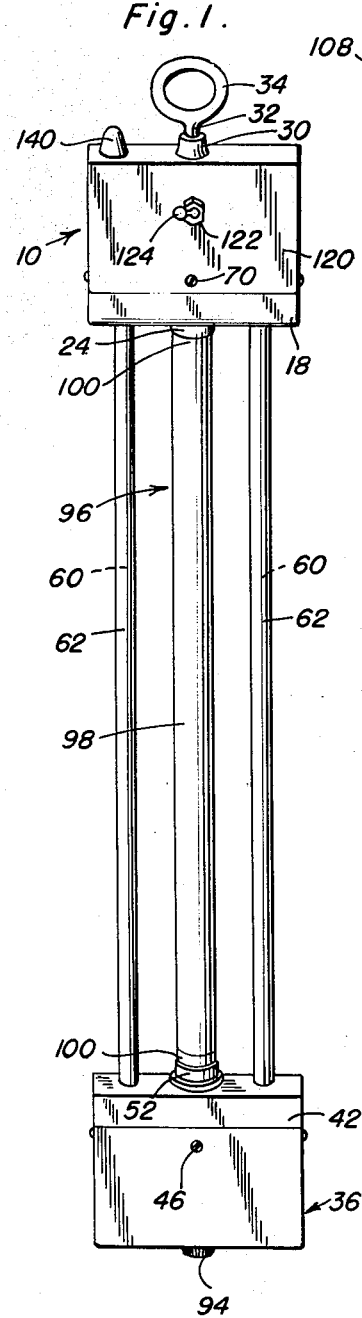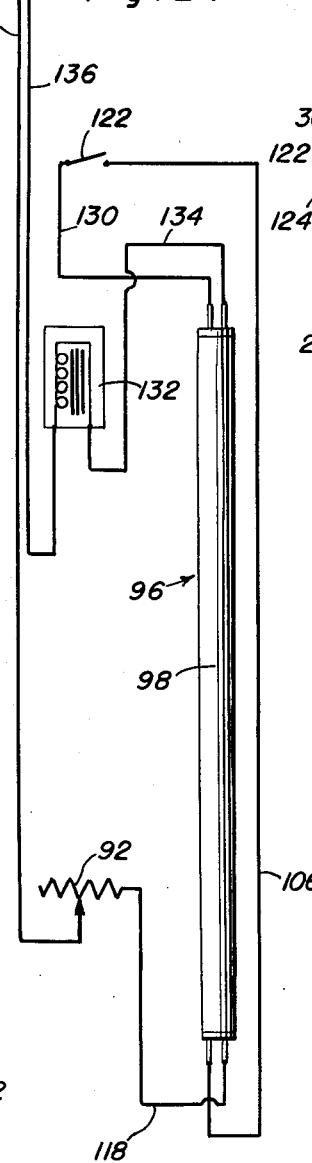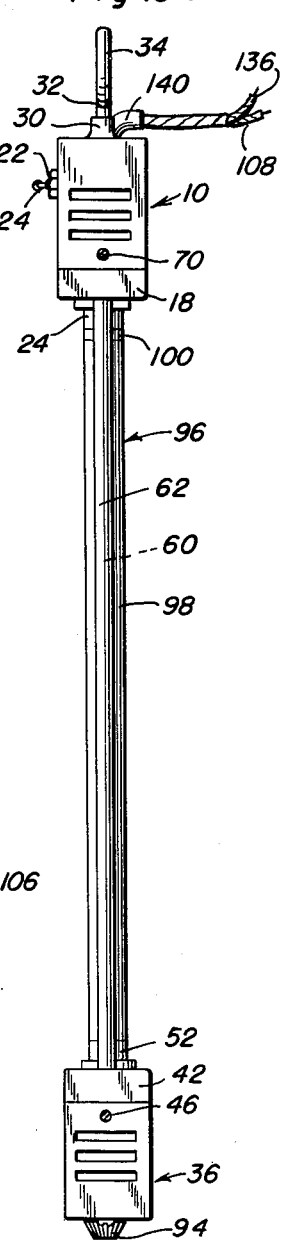

2,586,625

UNITED STATES PATENT OFFICE 2,586,625

APPARATUS FOR TREATING MATERIALS BY ULTRAVIOLET RADIATION

Virgil M. Downey, Clarksburg, W. Va.

Application June 8, 1948, Serial No. 31,821

3 Claims. (Cl. 240—11.4)

This invention relates to new and useful improvements in apparatus for and method of treating materials and the primary object of the present invention is to provide an apparatus including an ultraviolet ray lamp for destroying bacteria life and preserving meat and other food stuffs, and novel and improved means for regulating the amount of radiation of rays emitted from the lamp to facilitate the use of the present apparatus in various sizes of refrigerators, storing compartments or the like.

Another important object of the present invention is to provide an apparatus for treating meat and other food stuffs that is so designed as to provide a regulated distribution of ultraviolet rays to meat, food stuffs or the like in various sizes of containers, thus eliminating the spoilage of meat or the like from too much radiation or insufficient ultraviolet rays.

Another object of the present invention is to provide an apparatus for treating meats and the like including a pair of supports between which is mounted an ultraviolet ray lamp, and novel and improved reflector means carried by the supports for increasing the efficient reflecting of ultraviolet rays from the lamp.

Another object of the present invention is to provide an apparatus for treating meat and other food stuffs that is extremely small and compact in structure to facilitate the convenient handling and placing of the same within a suitable storage container.

A further object of the present invention is to provide an apparatus for treating materials all parts of which are quickly and readily assembled or disassembled facilitating the convenient inspection, replacing or repair of parts.

A still further aim of the present invention is to provide an apparatus for treating meats, food stuffs and the like that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the present invention;

Figure 2 is a schematic diagram showing the electrical circuit used in conjunction with the present invention;

Figure 3 is a side elevational view of Figure 1;

Figure 4 is an enlarged fragmentary front elevational view of the present invention, and with parts thereof broken away and shown in section; and, Figure 5 is a longitudinal vertical sectional view taken substantially on the plane of section line 5—5 of Figure 4.

Referring now to the drawings in detail, wherein for the purpose of illustration, there is disclosed a preferred embodiment of the present invention, the numeral 10 represents an upper, substantially rectangular housing that is formed with an opening 12 in its lower wall 14 that frictionally engages the flanged portion 16 of a closure plate 18.

Removably secured by bolts and nuts 20 to the central portion 22 of the closure plate 18, is a preferably resilient, non-conductive plug 24 having a pair of contact fingers 26 mounted therein.

Fixed to the upper wall 28 of the upper support 10, is a socket 30 that universally supports a ball (not shown) fixed on the shank portion 32 of an arm member 34.

The numeral 36 represents the lower, preferably rectangular support or housing the upper end 38 of which is open to frictionally embrace the depending flanged portion 40 of a closure plate 42 having a peripheral stop shoulder 44 that frictionally engages the upper end 38. Fasteners 46 are employed for securing the flanged portion 40 of the closure 42 to the upper end 38 of the support 36.

Removably secured to the central portion 48 of the closure plate 42, by fasteners or the like 50, is a preferably resilient socket 52. This socket 52 is provided with a pair of contact fingers 54 recessed therein.

Extending into aligned openings 56 provided in the closure 18 and the lower wall 14 of the support 10, are the upper terminals 58 of a pair of spaced, parallel connecting bars 60 which are covered by a polished aluminum coating or sleeve 62. The terminals 58 are formed with transverse openings 64 that align openings 66 and 68 provided in the flanged portion 16 and the bottom wall 14 for engaging holding pins or fasteners 70 that will prevent disengagement of the bars 60 from the upper support 10 and closure plate 18.

The lower ends 72 of the bars 60 and sleeves 62 extend through apertures 74 in the closure plate 42 and terminate in tapered end portions 76 that engage substantially V-shaped grooves 78 provided in the lower wall 80 of the lower support 36.

Fasteners 82 adjustably carried by the bottom wall 80 receivably engage internally threaded apertures 84 formed in the lower ends 72 of the bars 60 for holding the bars fixed to the support 36. Frictionally engaging annular grooves 86 provided in the sleeves 62, are annular, resilient sealing rings 88 that frictionally engage the lower face of the closure 42 to prevent moisture passing to the support 36 through the apertures 74. Removably secured by bolts or the like 90 to the bottom wall 80 of the lower support 36, is a conventional rheostat 92 having a control knob 94.

The numeral 96 represents a ultraviolet ray lamp generally, including a tube 98 having resilient plugs 100 at its ends which are provided with prongs 102 that engage the fingers 26 and 54.

Extending longitudinally through a guide opening 104 provided in one of the connecting bars 60, is a pair of conductive wires 106 and 108 the lower ends 110 and 112 of which are connected to one terminal 114 of the rheostat 92 and one finger 54 of the socket 52. The remaining terminal 116 of the rheostat 92 is connected to a conductive wire 118 that extends from the remaining conductive finger 54 of the socket 52.

Fixed to one wall 120 of the upper support 10, is a switch 122 having an actuating lever 124 and conductive terminals 126 and 128, one of which, for example 126, is connected to the wire 106. Connecting the terminal 128 of the switch 122 to one of the conductive fingers 26 for the socket 24, is a conductive wire 130.

Removably mounted within the upper support 10, is a conventional ballast 132 one terminal of which is connected to a conductive wire 134 that extends from the remaining conductive finger 26 of the socket 24. Leading from the remaining terminal of the ballast 132, is a further conductive wire 136 that extends with wire 108 outwardly through an opening 138 in the upper wall 28 of the upper support 10. A resilient sleeve 140 slidably mounted on the wires 136 and 108 frictionally engages the upper wall 28 for closing the opening 138.

In practical use of the present apparatus, the same may be hung by the use of the eye member 34 or may lay on one of the faces of the upper support 10 and lower support 36. By adjusting the rheostat 92 by the knob 94, a selected quality of ultraviolet rays radiated from the tube 98 may be maintained, so that the present invention may be employed in various types and sizes of refrigerators or other storage compartments. It being understood, that the normal method employed for treating meats and the like is to employ an ultraviolet ray tube having a constant radiation, however, this type of tube cannot be employed in relatively small containers as well as large containers. With the use of the present invention, the voltage may be set down so that the tube can be used in small containers thus eliminating the excess searing and drying of meat due to an increase in radiation from the tube.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An apparatus for treating materials by ultraviolet radiation comprising a pair of spaced supports, an ultra-violet ray lamp including a tube, a plug at each end of the tube, sockets carried by the supports receiving the plugs, means electrically connecting said sockets to a source of current, a rheostat housed in one of said supports for regulating the supply of current to the sockets, a plurality of connecting bars, means securing the ends of said bars to said supports, and reflectors embracing said bars, said last mentioned means including fasteners carried by one of said supports, said bars having tapered terminals, internal threaded apertures provided in the tapered terminals of said bars receivably engaging the fasteners, and grooves provided in said one of said supports receiving the tapered terminals of said bars.

2. The combination of claim 1 wherein each of said supports includes a plurality of flat faces forming bearing surfaces.

3. The combination of claim 1 wherein said first mentioned means includes electrical conductors, one of said connecting bars having an elongated opening receiving said conductors.

VIRGIL M. DOWNEY.

REFERENCES CITED

The following references are of record in the file of this patent:

UNITED STATES PATENTS

| Number | Name | Date |
| --- | --- | --- |
| 1,981,954 | Heller, Sr. | Nov. 27, 1934 |
| 2,215,635 | Collins | Sept. 24, 1940 |
| 2,313,983 | Yost et al. | Mar. 16, 1943 |
| 2,318,536 | Stern | May 4, 1943 |
| 2,327,346 | Furedy | Aug. 24, 1943 |
| 2,337,746 | Garstang | Dec. 28, 1943 |
| 2,369,123 | Abshire | Feb. 13, 1945 |
| 2,489,686 | Suter | Nov. 29, 1949 |